United States Patent
Diez et al.

(10) Patent No.: US 8,075,411 B2
(45) Date of Patent: Dec. 13, 2011

(54) OPTIMIZED CONSTANT-VELOCITY FIXED JOINT WITH BALL TRACKS FREE FROM UNDERCUTS

(75) Inventors: Marta Diez, San Sebastian (ES); José Manuel Cubert, San Sebastian (ES); Inaki Gutierrez, San Sebastian (ES); Joachim Schmeink, Duisburg (DE)

(73) Assignee: GKN Driveline International GmbH, Lohmar (DE)

( * ) Notice: Subject to any disclaimer, the term of this patent is extended or adjusted under 35 U.S.C. 154(b) by 646 days.

(21) Appl. No.: 12/067,806

(22) PCT Filed: Sep. 23, 2005

(86) PCT No.: PCT/EP2005/010291
§ 371 (c)(1),
(2), (4) Date: Nov. 10, 2008

(87) PCT Pub. No.: WO2007/036237
PCT Pub. Date: Apr. 5, 2007

(65) Prior Publication Data
US 2009/0298598 A1      Dec. 3, 2009

(51) Int. Cl.
*F16D 3/223*       (2006.01)
(52) U.S. Cl. .................................. 464/145; 464/906
(58) Field of Classification Search .............. 464/15, 464/140, 141, 142, 143, 144, 145, 906, 139, 464/146
See application file for complete search history.

(56) References Cited

U.S. PATENT DOCUMENTS

| | | | | |
|---|---|---|---|---|
| 3,879,960 A | * | 4/1975 | Welschof et al. | 464/145 |
| 4,188,803 A | * | 2/1980 | Otsuka et al. | 464/145 |
| 4,608,028 A | * | 8/1986 | Welschof et al. | 464/145 |
| 5,221,233 A | * | 6/1993 | Jacob | 464/145 |
| 5,290,203 A | * | 3/1994 | Krude | 464/145 |
| 6,227,979 B1 | * | 5/2001 | Yamamoto et al. | 464/145 |
| 6,299,542 B1 | * | 10/2001 | Ouchi et al. | 464/145 |
| 6,306,044 B1 | * | 10/2001 | Schwarzler | 464/145 |
| 6,705,947 B1 | * | 3/2004 | Hildebrandt et al. | 464/145 |
| 7,097,567 B2 | * | 8/2006 | Kobayashi et al. | 464/145 |

(Continued)

FOREIGN PATENT DOCUMENTS

| | | |
|---|---|---|
| JP | 11311257 A | 11/1999 |
| JP | 2000018267 A | 1/2000 |

OTHER PUBLICATIONS

First Office Action dated Jan. 8, 2010 from State Intellectual Property Office, P.R. China for App. No. 200580051645.7.

*Primary Examiner* — Gregory Binda
*Assistant Examiner* — Josh Skroupa
(74) *Attorney, Agent, or Firm* — Rader, Fishman & Grauer, PLLC

(57) ABSTRACT

Constant-velocity fixed joints may comprise an outer joint part with outer ball tracks, an inner joint part with inner ball tracks, torque transmitting balls which are guided in pairs of tracks each formed of an outer and an inner ball track, and a ball cage with circumferentially distributed cage windows in which the balls are received. Here, the balls are held in a common central plane and are guided onto the bisecting plane when the joint is deflected. Constant-velocity rotary joints of this type are known as Rzeppa fixed joints (RF) or as undercut-free fixed joints (UF).

19 Claims, 1 Drawing Sheet

U.S. PATENT DOCUMENTS

| | | | |
|---|---|---|---|
| 7,419,433 B2 * | 9/2008 | Nakagawa et al. | 464/145 |
| 7,632,190 B2 | 12/2009 | Nakao et al. | |
| 7,704,149 B2 * | 4/2010 | Yamazaki et al. | 464/145 |
| 2003/0083135 A1 | 5/2003 | Yamazaki et al. | |
| 2007/0161428 A1 * | 7/2007 | Nakao et al. | 464/145 |
| 2008/0248884 A1 | 10/2008 | Ishijima et al. | |

* cited by examiner

OPTIMIZED CONSTANT-VELOCITY FIXED JOINT WITH BALL TRACKS FREE FROM UNDERCUTS

CROSS REFERENCE TO RELATED APPLICATIONS

This application is a National Phase of International Application No. PCT/EP2005/010291, filed on Sep. 23, 2005, which application is hereby incorporated by reference in its entirety.

TECHNICAL FIELD

The invention relates to a constant-velocity rotary joint in the form of a constant-velocity fixed joint for torque transmission.

BACKGROUND

Constant-velocity fixed joints may comprise an outer joint part with outer ball tracks, an inner joint part with inner ball tracks, torque transmitting balls which are guided in pairs of tracks each formed of an outer and an inner ball track, and a ball cage with circumferentially distributed cage windows in which the balls are received. Here, the balls are held in a common central plane and are guided onto the bisecting plane when the joint is deflected. Constant-velocity rotary joints of this type are known as Rzeppa fixed joints (RF) or as undercut-free fixed joints (UF).

U.S. Pat. No. 6,319,133 has disclosed a constant-velocity rotary joint having undercut-free ball tracks, the ball tracks of the outer joint part having in each case convexly curved inner sections and, toward the opening side, end sections which are in each case curved concavely in an opposite direction with respect to the former.

U.S. Pat. No. 5,782,696 has disclosed a constant-velocity rotary joint having undercut-free ball tracks, the curvature center points of the ball tracks being offset axially with respect to the central plane.

Development in automotive engineering demands increased performance of the known constant-velocity rotary joints. This means that, with the predefined installation space and predefined mass, the service life and functional scope are to be increased or that, with the predefined service life and functional scope, the installation space and the mass are to be reduced. Here, the difficulty lies in the interrelationship between the size of the joint on one side and its strength and service life on the other.

U.S. Pat. No. 5,509,857 has disclosed a constant-velocity rotary joint as a Rzeppa fixed joint with continuously curved ball tracks with undercuts. The balls have a diameter BD and lie on the pitch circle diameter BCD about the joint center point M. It is said that the ratio between the pitch circle diameter PCD and the ball diameter BD usually lies between 3.1 and 3.5. With regard to a high stability of the constant-velocity rotary joint, it is cited as particularly advantageous to select the ratio between the pitch circle diameter PCD and the ball diameter BD to be greater than 3.5.

SUMMARY OF THE INVENTION

It is an object of the present invention to propose a constant-velocity rotary joint of the type which is mentioned in the introduction, which constant-velocity rotary joint has a greater strength and a longer service life, without it being necessary for reductions in remaining parameters to be accepted.

The solution comprises a constant-velocity universal ball joint in the form of a fixed joint comprising an outer joint part with outer ball tracks which are axially undercut-free; an inner joint part with inner ball tracks which are axially undercut-free; torque transmitting balls which are guided in pairs of tracks each formed of an outer and an inner ball track and whose ball centers Z are positioned on the pitch circle diameter PCD around the joint center M and which comprise a ball diameter D; a ball cage with circumferentially distributed cage windows in which the balls are received and held in a common central plane; the ratio between the pitch circle diameter PCD and the ball diameter D ranging between 2.96 and 3.08.

The advantage lies in the fact that the balls have a relatively large diameter in relation to the pitch circle diameter PCD. This results in a particularly long service life, without the overall size and the mass of the joint being increased. The ball tracks of the constant-velocity rotary joint are undercut-free, with the result that production processes without the removal of material can be used. Here, the ball tracks can either have, in addition to a curved section, a rectilinear section which extends parallel to the longitudinal axis, or they can have a continuous curvature radius as far as the end face of the outer joint part, or they can be composed of at least two sections of different curvature which adjoin one another. The constant-velocity rotary joint according to the invention relates, in particular, to a joint having six torque transmitting balls. It is particularly favorable if the ratio between the pitch circle diameter PCD and the ball diameter D ranges between 2.97 and 3.074.

According to one preferred development, the ball cage comprises a radial cage thickness B, wherein the ratio between the cage thickness B and the pitch circle diameter PCD ranges between 0.08 and 0.1, preferably between 0.089 and 0.094. The cage thickness relates to a radial extent between a spherical inner face and a spherical outer face of the ball cage. The advantage lies in the fact that the cage thickness is relatively great in comparison with the pitch circle diameter. This results in enlarged cross-sectional surfaces of the ball cage, in particular in the region of the webs which are formed between the windows, which leads to an increased strength of the joint.

Furthermore, the ratio between the cage thickness B and the ball diameter D preferably ranges between 0.27 and 0.29. Here, it is particularly favorable if the abovementioned ratio between the cage thickness B and the ball diameter D ranges between 0.275 and 0.280. This refinement also results in a comparatively great cage thickness, which has a favorable effect on the strength of the joint.

According to one preferred development, the shaft connected to the inner joint part in a rotationally fast way comprises a supporting shaft diameter DW, wherein the ratio between the cage thickness B and the supporting shaft diameter DW ranges between 0.21 and 0.24, preferably between 0.218 and 0.231. This refinement likewise has the advantage of a high strength of the joint, with an otherwise identical overall size and identical mass. The supporting shaft diameter DW is arranged so as to axially adjoin a longitudinal toothing system for providing a connection with the inner joint part. In concrete terms, the supporting shaft diameter DW is smaller than a greatest external diameter of the longitudinal toothing system.

BRIEF DESCRIPTION OF THE DRAWINGS

The FIGURE is an illustration of a constant velocity fixed joint in accordance with the present invention.

DETAILED DESCRIPTION OF THE PREFERRED EMBODIMENT

Figure 1:
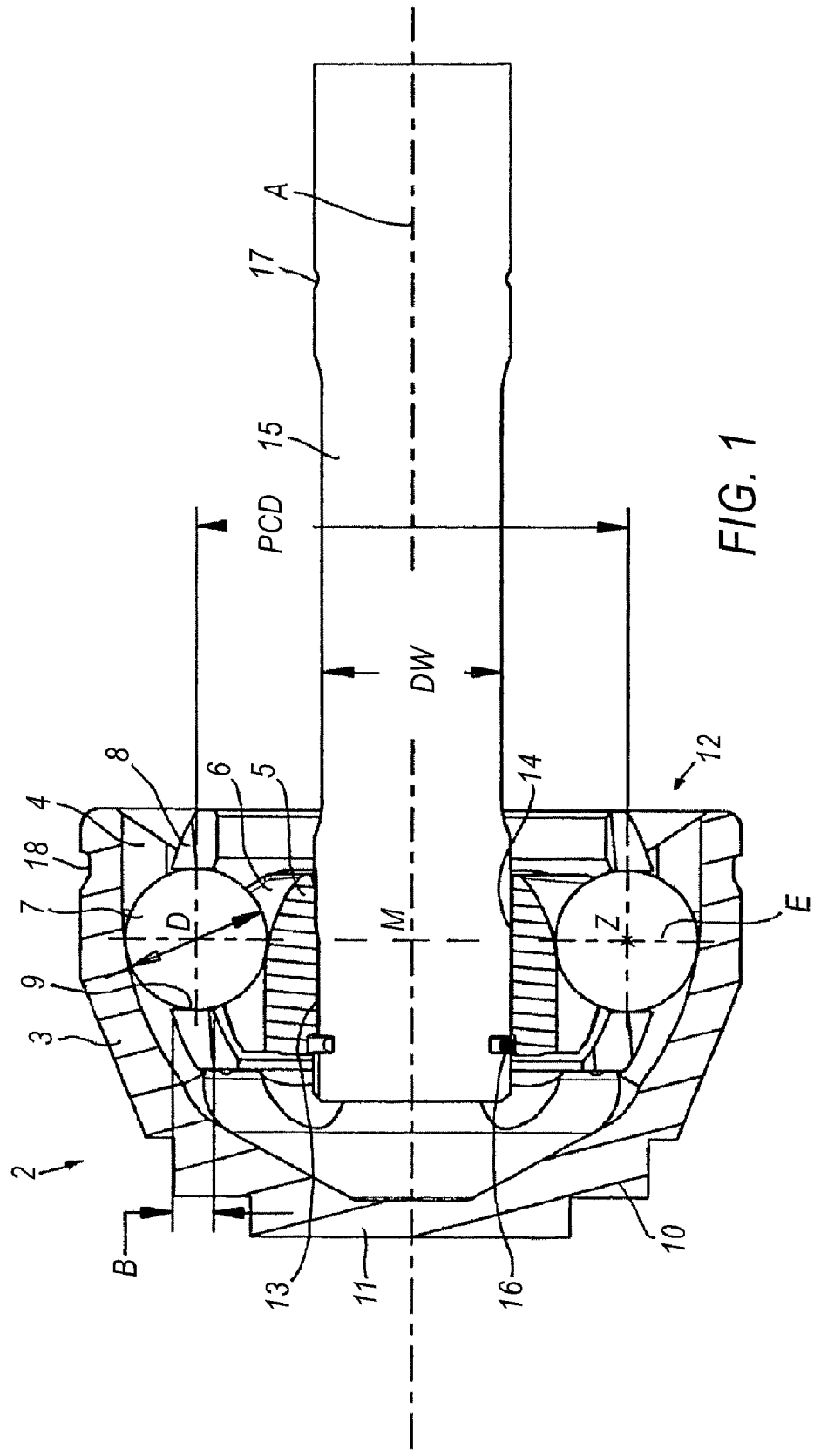

Referring now to the FIGURE, a constant-velocity rotary joint 2 is shown in the form of a fixed bearing (UF), which comprises an outer joint part 3 with outer tracks 4, an inner joint part 5 with inner tracks 6, torque transmitting balls 7 which are guided in each case in a pair of tracks formed from an outer track 4 and an inner track 6, and a ball cage 8 with circumferentially distributed windows 9 in which the balls 7 are received. The balls 7 are held in a common central plane E and are guided onto the bisecting plane if the joint is deflected. Here, the ball centers Z are positioned on the pitch circle diameter PCD around a joint center M and have a ball diameter D. The number of torque transmitting balls 7 and cage windows 9 is six in one embodiment, although other numbers of balls 7 would be obvious in light of the present disclosure.

The outer joint part 3 is closed off on one side by a base 10 which is adjoined by a pivot 11 for torque transmission. An opening 12 of the outer joint part 3 lies opposite the base 10 in the axial direction. The outer tracks 4 which are distributed circumferentially in the outer joint part 3 are undercut-free and, as viewed from the opening side, have a straight track section which extends parallel to the rotational axis A and a curved track section which adjoins the former. The inner tracks 6 which are provided in the inner joint part 5 are likewise undercut-free and comprise a curved track section and a straight track section which adjoins the former and extends parallel to the longitudinal axis A. All ball tracks which are formed in pairs from in each case one inner track 6 and one outer track 4 widen in the direction of the opening 12 of the joint. However, it is contemplated that the present invention can also be used for undercut-free fixed joints of this type, in which the ball tracks open in the direction of the base.

The inner joint part 5 comprises a central opening 14, into which a shaft 15 is plugged as connecting part and is fixed axially by means of a securing ring 16. The torque is transmitted between the shaft 15 and the inner joint part 5 by means of a longitudinal toothing system 13 which has a stepped profile over its axial length. Here, the longitudinal section which is shown in the upper FIGURE half extends through the tooth root and the longitudinal section which is shown in the lower FIGURE half extends through the tooth crown of the toothing system of the shaft 15. Following the longitudinal toothing system 13, the shaft 15 has a tapered region having a very small external diameter DW which defines the supporting region of the shaft 15. The shaft 15 has an annular groove 17, into which a first collar of a folding bellows can engage, and the outer joint part 3 has a circumferential recess 18, to which a second collar of the folding bellows can be fastened. The folding bellows serves to seal the joint space.

It can be seen that the ratio between the pitch circle diameter PCD, from which the ball centers Z are positioned, and the ball diameter D is approximately 3.0. For other overall sizes of the constant-velocity rotary joint according to the invention, this ratio can range between 2.96 and 3.08 (2.96<PCD/D<3.08). The construction according to the invention results in a constant-velocity rotary joint having an increased strength and therefore extended service life.

Furthermore, it can be seen that the ratio between the cage thickness B and the pitch circle diameter PCD is approximately 0.09. For joints of different overall sizes, this ratio can also be a minimum of 0.08 and a maximum of 0.1 (0.08<B/PCD<0.1).

Furthermore, the ratio between the cage thickness B and the ball diameter D lies at approximately 0.275. The overall sizes of the joint according to the invention can also have a ratio between the cage thickness B and the ball diameter D which ranges between 0.27 and 0.28 (0.27<B/D<0.28).

In the present case, the ratio between the cage thickness B and the supporting shaft diameter DW is approximately 0.23. For other overall sizes of the constant-velocity rotary joint which is shown, this ratio can also be a minimum of 0.21 and a maximum of 0.24 (0.21<B/DW<0.24).

The constant-velocity rotary joint according to the invention is distinguished by balls having a comparatively great ball diameter, which leads to a relatively high service life. At the same time, the resulting disadvantage of relatively long cage windows is canceled out by a relatively great radial cage thickness, with the result that the cage strength is increased. Overall, the constant-velocity rotary joint according to the invention has a high service life and a high strength with identical or smaller overall size and mass.

The invention claimed is:

1. A constant velocity universal ball joint in the form of a fixed joint comprising:
    an outer joint part with outer ball tracks which are axially undercut-free;
    an inner joint part with inner ball tracks which are axially undercut-free;
    torque transmitting balls which are guided in pairs of tracks each formed of an outer and an inner ball track and whose ball centers are positioned on a pitch circle diameter (PCD) around a joint center (M) and which comprise a ball diameter (D); and
    a ball cage with circumferentially distributed cage windows in which said torque transmitting balls are received and held in a common central plane (E), wherein a ratio between said pitch circle diameter (PCD) and said ball diameter (D) ranges between 2.96 and 3.08 (2.96<PCD/D<3.08).

2. A constant velocity universal ball joint according to claim 1, wherein said ball cage comprises a radial cage thickness (B), wherein the ratio between said radial cage thickness (B) and said ball diameter (D) ranges between 0.27 and 0.29 (0.27<B/D<0.29).

3. A constant velocity universal ball joint according to claim 1,
    wherein in the region of said circumferentially distributed cage windows, said ball cage comprises a radial cage thickness (B); and a shaft connected to said inner joint part in a rotationally fast way and comprising a supporting shaft diameter (DW), wherein the ratio between said radial cage thickness (B) and said supporting shaft diameter (DW) ranges between 0.21 and 0.24 (0.21<B/DW<0.24).

4. A constant velocity universal ball joint according to claim 3, wherein said supporting shaft diameter (DW) is arranged so as to axially adjoin a longitudinal toothing for providing a connection with said inner joint part.

5. A constant velocity universal ball joint according to claim 4, wherein said supporting shaft diameter (DW) is smaller than a greatest outer diameter of said longitudinal toothing.

6. A constant velocity universal ball joint according to claim 5, wherein said longitudinal toothing comprises a step profile over an axial length.

7. A constant velocity universal joint according to claim 3, wherein said ball cage comprises a radial cage thickness (B), wherein the ratio between said radial cage thickness (B) and said ball diameter (D) ranges between 0.27 and 0.29 (0.27<B/D<0.29).

8. A constant velocity universal ball joint according to claim 1, wherein the number of said torque transmitting balls amounts to six.

9. A constant velocity universal joint according to claim 1, wherein said ball cage comprises a radial cage thickness (B), wherein the ratio between said radial cage thickness (B) and said pitch circle diameter (PCD) ranges between 0.08 and 0.1 (0.08<B/PCD<0.1).

10. A constant velocity universal ball joint in the form of a fixed joint comprising:
   an outer joint part with outer ball tracks which are axially undercut-free;
   an inner joint part with inner ball tracks which are axially undercut-free;
   a plurality of torque transmitting balls positioned between said outer ball tracks and said inner ball tracks, said torque transmitting balls having ball centers (Z) positioned on a pitch circle diameter (PCD) around a joint center (M), said torque transmitting balls each having a ball diameter (D);
   wherein a ratio between said pitch circle diameter (PCD) and said ball diameter (D) ranges between 2.96 and 3.08 (2.96<PCD/D<3.08).

11. The constant velocity universal ball joint according to claim 10, further comprising a ball cage with circumferentially distributed cage windows in which said torque transmitting balls are received and held in a common central plane (E), said ball cage comprising a radial cage thickness (B).

12. A constant velocity universal ball joint as described in claim 11 wherein the ratio between said radial cage thickness (B) and said pitch circle diameter (PCD) is between 0.08 and 0.1 (0.08<B/PCD<0.1).

13. A constant velocity universal ball joint as described in claim 12, wherein the ratio between said radial cage thickness (B) and said ball diameter (D) is between 0.27 and 0.29 (0.27<B/D<0.29).

14. The constant velocity universal ball joint according to claim 10, further comprising a shaft connected to said inner joint part in a rotationally fast way, said shaft comprising a supporting shaft diameter (DW).

15. A constant velocity universal ball joint according to claim 14,
   wherein a ratio between a radial cage thickness (B) and said supporting shaft diameter (DW) is between 0.21 and 0.24 (0.21<B/DW<0.24).

16. A constant velocity universal ball joint as described in claim 14, wherein said shaft further comprises a longitudinal toothing adjacent said supporting shaft diameter, said longitudinal toothing engaging said inner joint part in a rotationally fast way.

17. A constant velocity universal ball joint as described in claim 16, wherein said supporting shaft diameter (DW) is smaller than a greatest outer diameter of said longitudinal teeth.

18. A constant velocity universal ball joint as described in claim 16, wherein said longitudinal toothing comprises a step profile over an axial length.

19. A constant velocity universal ball joint as described in claim 14, wherein said plurality of torque transmitting balls comprises six torque transmitting balls.

* * * * *